US008523550B2

(12) United States Patent
Wehrli et al.

(10) Patent No.: US 8,523,550 B2
(45) Date of Patent: Sep. 3, 2013

(54) POWDER PRESS FOR THE MANUFACTURE OF A METAL POWDER COMPACT

(75) Inventors: Alex Wehrli, Kehrsatz (CH); Daniel Meier, Schmitten (CH); Beat Straub, Ipsach (CH)

(73) Assignee: Osterwalder AG, Lyss (CH)

( * ) Notice: Subject to any disclaimer, the term of this patent is extended or adjusted under 35 U.S.C. 154(b) by 369 days.

(21) Appl. No.: 12/922,871

(22) PCT Filed: Mar. 12, 2009

(86) PCT No.: PCT/EP2009/052905
§ 371 (c)(1),
(2), (4) Date: Oct. 18, 2010

(87) PCT Pub. No.: WO2009/115444
PCT Pub. Date: Sep. 24, 2009

(65) Prior Publication Data
US 2011/0027400 A1 Feb. 3, 2011

(30) Foreign Application Priority Data
Mar. 17, 2008 (EP) .................................... 08152858

(51) Int. Cl.
*B29C 43/42* (2006.01)

(52) U.S. Cl.
USPC .............................. 425/78; 425/330; 100/232

(58) Field of Classification Search
USPC .................... 425/78, 330; 100/232; 264/120
See application file for complete search history.

(56) References Cited

U.S. PATENT DOCUMENTS 3,555,607 A 1/1971 Epain et al.
4,414,028 A * 11/1983 Inoue ............................ 425/330
4,999,156 A * 3/1991 Ashbee ......................... 100/110

FOREIGN PATENT DOCUMENTS

DE 195 08 952 A1 9/1996
WO 2007019832 A 2/2007

OTHER PUBLICATIONS

International Search Report dated May 18, 2009.

*Primary Examiner* — Richard Crispino
*Assistant Examiner* — Thukhanh Nguyen
(74) *Attorney, Agent, or Firm* — Pearne & Gordon LLP

(57) ABSTRACT

A powder press for producing a metal powder compact comprises an upper punch arrangement and a lower punch arrangement (1) which accommodates the die arrangement (3) which forms the mold cavity (8) into which the metal powder is filled, whereupon the pressing process is carried out. The lower punch arrangement (1) is equipped with a plate (2) on which the die arrangement (3) is placed and to which plate (2) cross pressing devices (4) are fastened. Each cross pressing device (4) is equipped with a cross pressing punch (5) that can be linearly driven by a drive unit and that can be pressed into and retracted out of the mold cavity (8) in the cross pressing direction through an opening (6) in the die (7) which is essentially perpendicular to the pressing direction. The drive unit of each cross pressing device (4) comprises a linear drive unit with a fixed part fastened to the frame (18) of the cross pressing device (4) and a part which is linearly moveable relative to the fixed part, said linearly moveable part being connected to a first wedge (19) whose wedge surface (22) acts on the wedge surface (23) of a second wedge (24) that can be moved essentially perpendicularly to the first wedge (19) in the direction of cross pressing. This allows compacts to be produced which exhibit lateral holes, side impressions or side impressions and protrusions applied during the pressing process, whereby the forces produced in the cross pressing direction can be optimally absorbed.

9 Claims, 13 Drawing Sheets

POWDER PRESS FOR THE MANUFACTURE OF A METAL POWDER COMPACT

The present invention relates to a powder press for producing a metal powder compact, with an upper punch arrangement, a lower punch arrangement and a die arrangement which forms the mold cavity into which the metal powder is filled; and then, to form the compact, the upper punch arrangement and the lower punch arrangement are pressed together in the pressing direction, controlled by a control unit; and the lower punch arrangement is equipped with a plate on which the die arrangement is placed, to which plate cross pressing devices are fastened, each device being equipped with a cross pressing punch which can be linearly driven by a drive unit and which can be pressed into and retracted out of the mold cavity in the direction of cross pressing through an opening in the die which is essentially perpendicular to the pressing direction.

Such powder presses have been elucidated in a wide variety of ways, they are used to manufacture powder compacts which are then sintered, making it possible to produce a variety of workpieces which can optimally fulfill the diverse demands placed on these workpieces; indexable inserts which are subjected to very high loads are produced like this, for example. When powder pressing tungsten carbide or other materials, the pressing is mainly carried out in one direction, usually in the vertical direction.

Powder presses have also been elucidated whereby cross rods are introduced through the die wall into the mold cavity at right angles to the pressing direction before the pressing process, said cross rods usually being brought into contact with a punch of the lower punch arrangement. These cross rods are moved via direct linear drives, for example hydraulically, which is possible because these cross rods do not have to absorb any pressing forces in the direction of their motion.

The objective of the present invention consists in designing the powder press such that the compact can also be formed during the pressing process with cross pressing punches, and the forces arising during the pressing can be absorbed in the direction of cross pressing.

According to the invention, the objective is achieved by the drive of each cross pressing device comprising a linear drive unit with a fixed part fastened to the frame of the cross pressing device and a part which can be moved linearly relative to the fixed part, said linearly moveable part being connected to a first wedge, whose wedge surface acts on the wedge surface of a second wedge, which can essentially be moved perpendicular to the first wedge in the direction of the cross pressing.

With this arrangement according to the invention it is possible to generate lateral holes in a metal powder compact, it is also possible to generate side impressions in this compact which do not go right through so that the cross pressing device can absorb the forces which arise in the direction of cross pressing during the pressing. The passages for the cross pressing punches can be made by means of cut-outs which are made in the annular die; the inner part of the die arrangement can also be completely divided or partially divided, these die components being separated from each other in order to form the cut-outs for the passages of the cross pressing punches, where said die components can be inserted in an annular die holder. This makes it possible to form side impressions and/or protrusions on the compact.

Since the drive unit of each cross pressing device comprises a linear drive unit with a fixed part fastened to the frame of the cross pressing device and a part which can be moved linearly relative to the fixed part, said linearly moveable part being connected to a first wedge, whose wedge surface acts on the wedge surface of a second wedge, which can essentially be moved perpendicularly to the first wedge in the direction of cross pressing, the forces acting on the cross pressing punch during the pressing process can be optimally absorbed without subjecting the linear drive unit to a high load.

Advantageously, the first wedge and the second wedge can be moved along linear guide tracks made in the frame of the cross pressing device, so that the forces arising and acting on the cross pressing punch are largely absorbed by the frame.

A further favorable embodiment of the invention consists in the fact that the pressing position of the cross pressing punch can be set by an adjustable end stop, whereby the pressing position of the cross pressing punch is always very accurately attainable regardless of other influences.

Advantageously, the end stop is formed by an adjustable third wedge perpendicular to the direction of motion of the first wedge, said wedge being guided in the frame and whose wedge surface interacts with a further wedge surface of the first wedge. This provides a very fine and exact adjustment method, on the one hand and, on the other, the end stop is very stable and subjected to almost no deformation.

Advantageously, the position of the cross pressing punch in relation to the die arrangement can be determined by means of measuring devices and transmitted to the control unit, whereby the position of the cross pressing punch is monitored and it is simple to adjust the pressing position of the cross pressing punch via the end stop.

A further advantageous embodiment of the invention consists in each cross pressing punch being held in the respective cross pressing device by means of a coupling device. This makes it easy to exchange the cross pressing punch, while the cross pressing device can be used to press practically all different forms of compact.

A further advantageous arrangement of the invention consists in each cross pressing device being equipped with a protruding bolt and the plate being equipped with several holes, said bolt protruding into one of the holes when the cross pressing device has been placed on the plate, and several cross pressing devices being able to be fastened on the plate in various positions. This allows the cross pressing devices to be used in predetermined positions with specific die arrangements without the need to align the cross pressing device to any great degree.

Advantageously, corresponding threaded holes are assigned to the holes in the plate into which clamping screws can be screwed which are held in the frame of each cross pressing device in corresponding cut-outs. The cross pressing devices can thus easily be fastened in the corresponding positions on the plate.

Advantageously, the cut-outs to hold the clamping screws in the frame of the cross pressing device have the form of a slot so that each cross pressing device placed onto the plate can be swiveled slightly around the bolt and can thus be aligned with respect to the die, whereupon the cross pressing device can be fixed to the plate by means of the clamping screws.

One embodiment of the invention will be described in further detail below as an example with the aid of the enclosed drawing, in which FIG. 1 shows a perspective view of a lower punch arrangement with a die arrangement with plate and three cross pressing devices fixed onto this plate;

Figure 3:
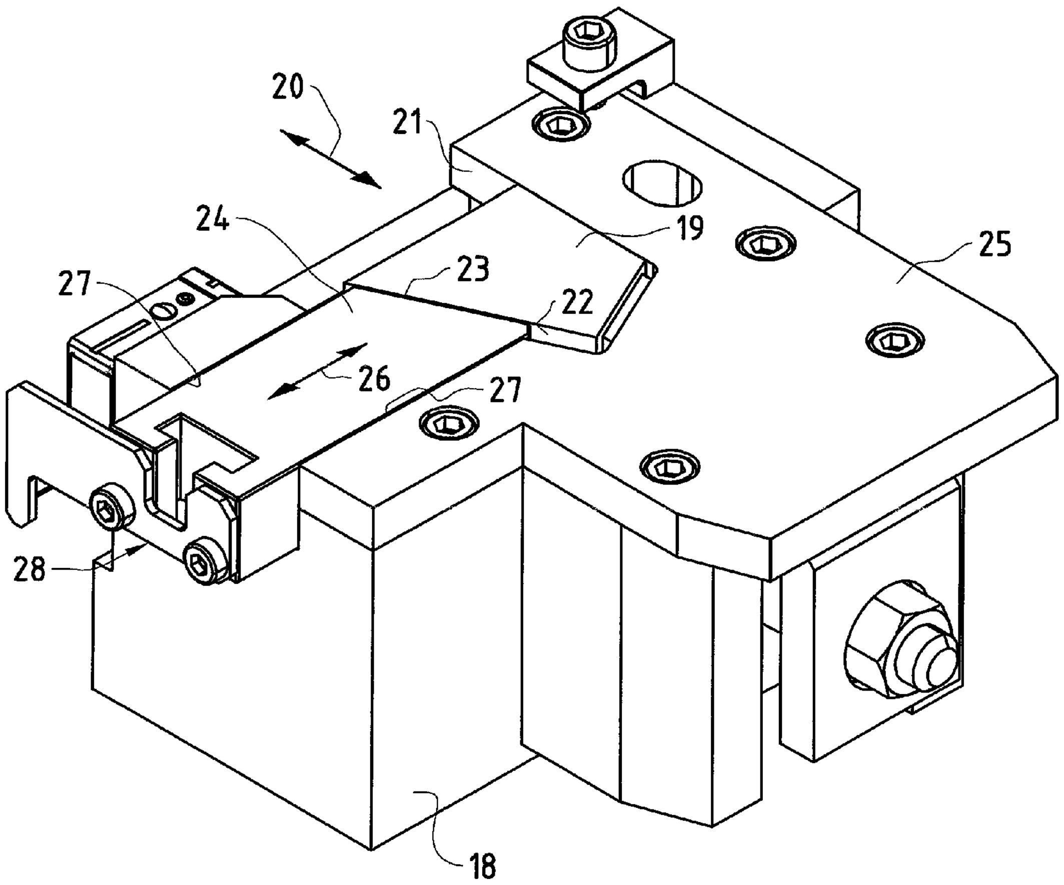
FIG. 3 shows a perspective view of a cross pressing device without cross pressing punch, in pressing position.
Figure 13:
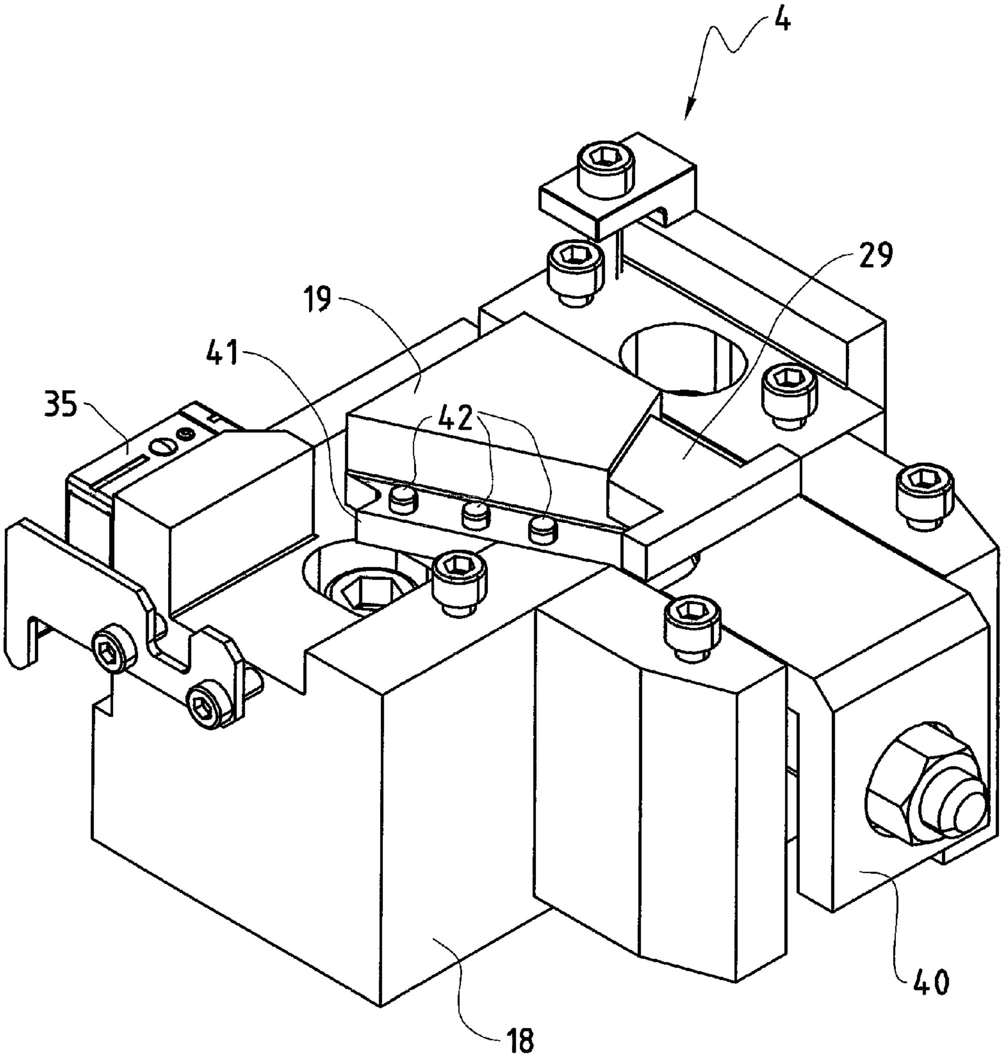

and FIG. 13 shows a perspective view of the cross pressing device according to FIG. 3 but with the second wedge removed.

Figure 1:
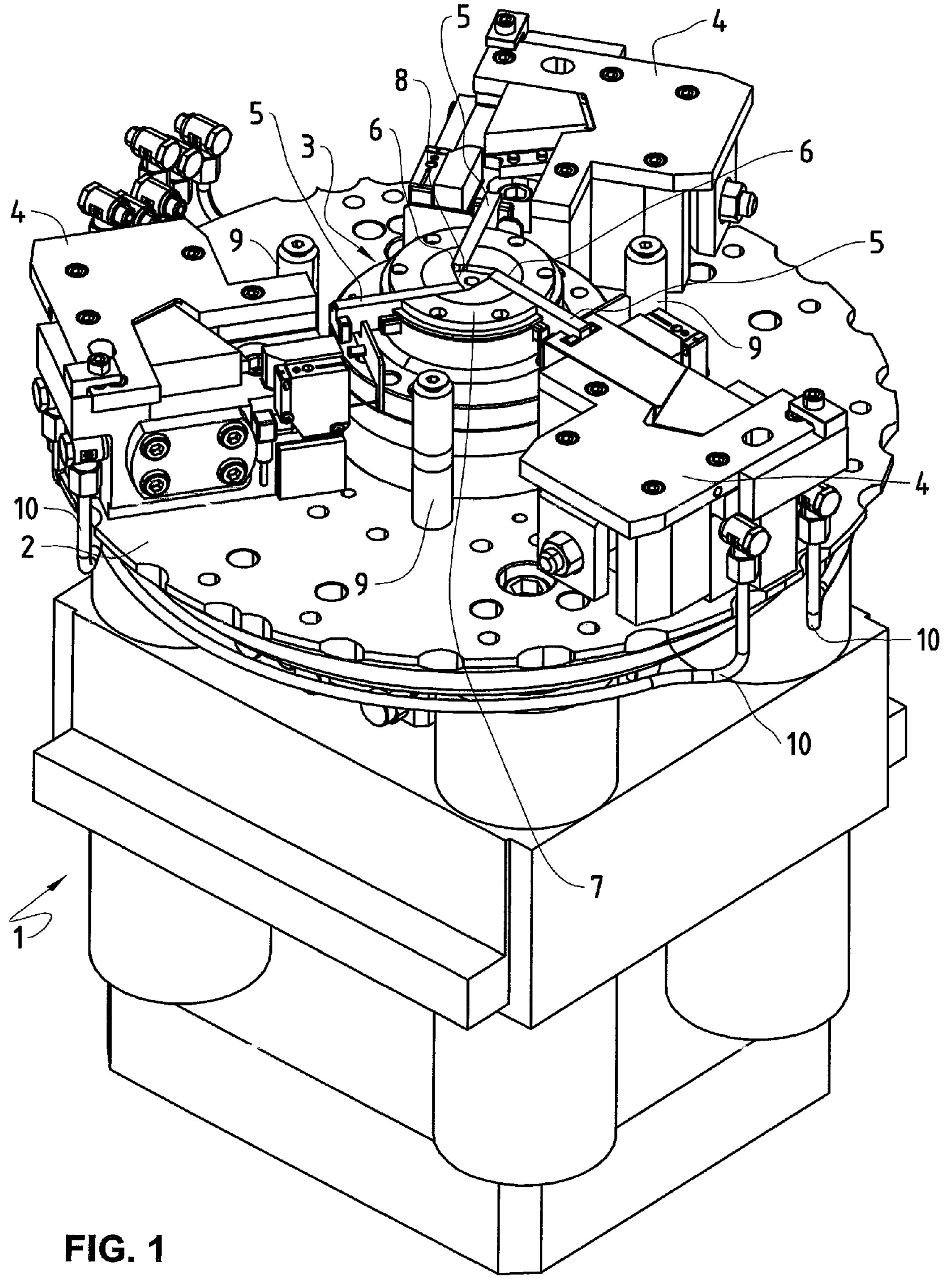

FIG. 1 shows a schematic representation of the lower punch arrangement 1, which is formed as an adapter and into which a powder press, which is not shown, can be inserted into the lower part as is known in the art. Onto this lower punch arrangement 1 a plate 2 is placed onto which a die arrangement 3 is fastened. Onto this plate 2 are fastened cross pressing devices 4 which are each equipped with a cross pressing punch 5 which can be linearly driven by a drive unit which will be described in detail later. These cross pressing punches 5 pass through openings 6 in the die 7 of the die arrangement 3, they lead into mold cavity 8 which is formed in the die arrangement 3, and into which the metal powder can be filled and formed into the corresponding compact during the pressing process as is known in the art.

In the arrangement of the device shown in FIG. 1 three cross pressing devices 4 are arranged on plate 2, it is naturally possible to arrange two to six cross pressing devices, for example, depending on the type of compact which is to be manufactured and the correspondingly designed dies.

Above the die arrangement 3 and the cross pressing devices 4 a filling shoe plate (not shown) is placed in the known way, to which end pillars 9 are mounted on plate 2, the filling shoe being mounted on said filling shoe plate in the known way so as to be moveable, and with which the mold cavity 8 can be filled with metal powder.

As will later be seen in detail, the drive unit of the cross pressing devices each have a hydraulic cylinder, hydraulic tubes 10 are attached to supply these hydraulic cylinders, which are connected to the hydraulic system of the powder press in the known way (not shown) and whose valves can be controlled in the way known in the art via a control unit of the powder press.

Figure 2:
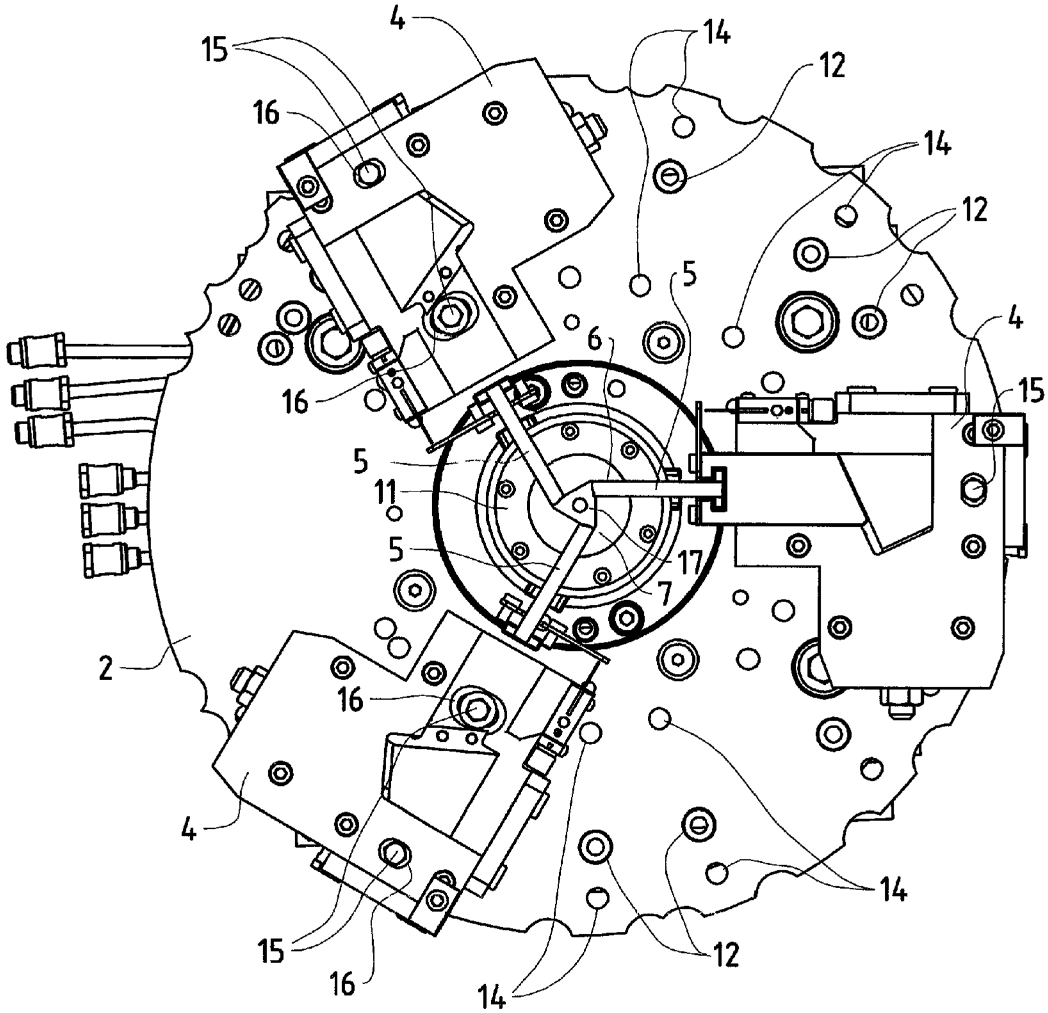
FIG. 2 shows a plan view of the die arrangement with the plate and the cross pressing devices fastened thereon according to FIG. 1.

FIG. 2 shows the arrangement of three cross pressing devices 4 on plate 2. The cross pressing punches 5 of these cross pressing devices 4 protrude into the die 7, the die 7 is split in the present example embodiment, the individual parts of this die 7 are inserted into a die ring 11, the divisions of the die 7 form the corresponding openings 6 for the cross pressing punch 5.

Plate 2 is equipped with several holes 12, these holes 12 serve to hold a bolt 13 (FIG. 7) which is attached to each cross pressing device 4 and protrudes on the underside, whereby the cross pressing device 4 can be positioned on plate 2. To each of these holes 12 are assigned two threaded holes 14 which are made into plate 2 and into which clamping screws 15 can be screwed whereby the cross pressing devices 4 can be fastened to plate 2. Slit-shaped cut-outs 16 for these clamping screws 15 are made in the cross pressing devices 4 so that each cross pressing device 4 can be swiveled slightly around the bolt 13 (FIG. 7) in the hole 12 and can be screwed tight in the corresponding position by means of the clamping screws, which means the cross pressing punch 5 does not have to be accurately aligned into the center of the die 7 but can deviate from the center, as can be seen with the die 7 of the embodiment according to FIG. 2. This die 7 is used to produce compacts 17 in the form of indexable inserts.

FIG. 3 shows a cross pressing device 4. This cross pressing device 4 comprises a frame 18 in which the drive unit, which is a linear drive unit, is mounted, as is described in detail below. This first linear drive unit can move a first wedge 19 in one direction, shown by the double arrow 20. This first wedge 19 is guided along a linear guide track 21 aligned parallel to the direction of motion, shown by the double arrow 20.This linear guide track 21 is fastened to the cover plate 25 which is screwed onto the frame 18.

A wedge surface 23 of a second wedge 24 is in contact with the wedge surface 22 of the first wedge 19. This second wedge 24 is likewise linearly moveable, namely in the direction perpendicular to the direction of motion of the first wedge 19, shown by the double arrow 20, i.e. in the direction represented by the double arrow 26. The direction represented by the double arrow 26 also corresponds to the direction of cross pressing, with which the cross pressing punch 5 (not shown) (FIGS. 1 and 2) can be moved. Moving the first wedge 19 along the linear guide track 21 causes the second wedge 24 to move in the direction of the double arrow 26, guided by the linear guides 27 which are likewise fastened in the cover plate 25. A coupling device 28 with which the cross pressing punch 5 (not shown) (FIGS. 1 and 2) can be held is fastened on the end of the second wedge 24 opposite the wedge surface 23; these cross pressing punches can easily be exchanged.

Figure 4:
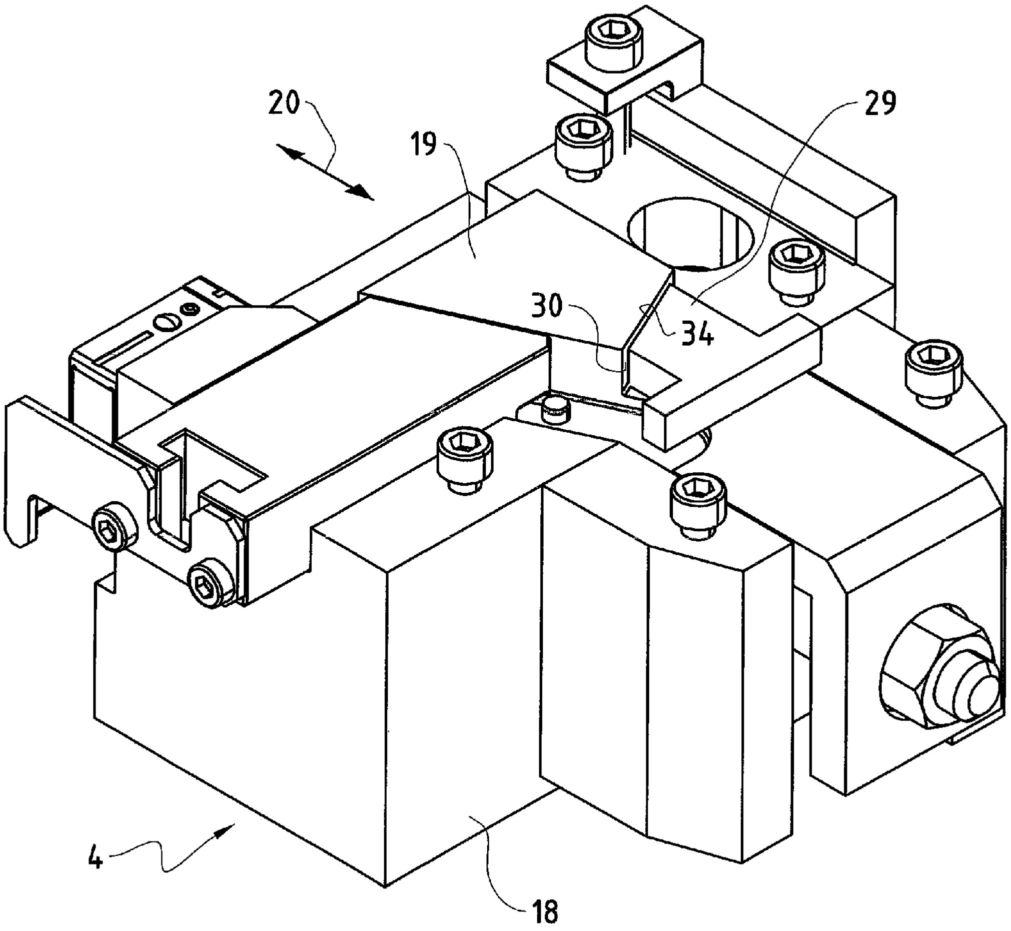
FIG. 4 shows a perspective view of the cross pressing device according to FIG. 3 with the cover plate removed.

FIG. 4 shows the cross pressing device 4 according to FIG. 3 but without the cover plate 25. In this representation it can be seen that the first wedge 19 interacts with a third wedge 29, the first wedge 19 having a further wedge surface 30 which is in contact with wedge surface 31 of the third wedge 29. This third wedge 29 serves as the end stop for the first wedge 19, said end stop being adjustable, as will be seen later.

Figure 5:
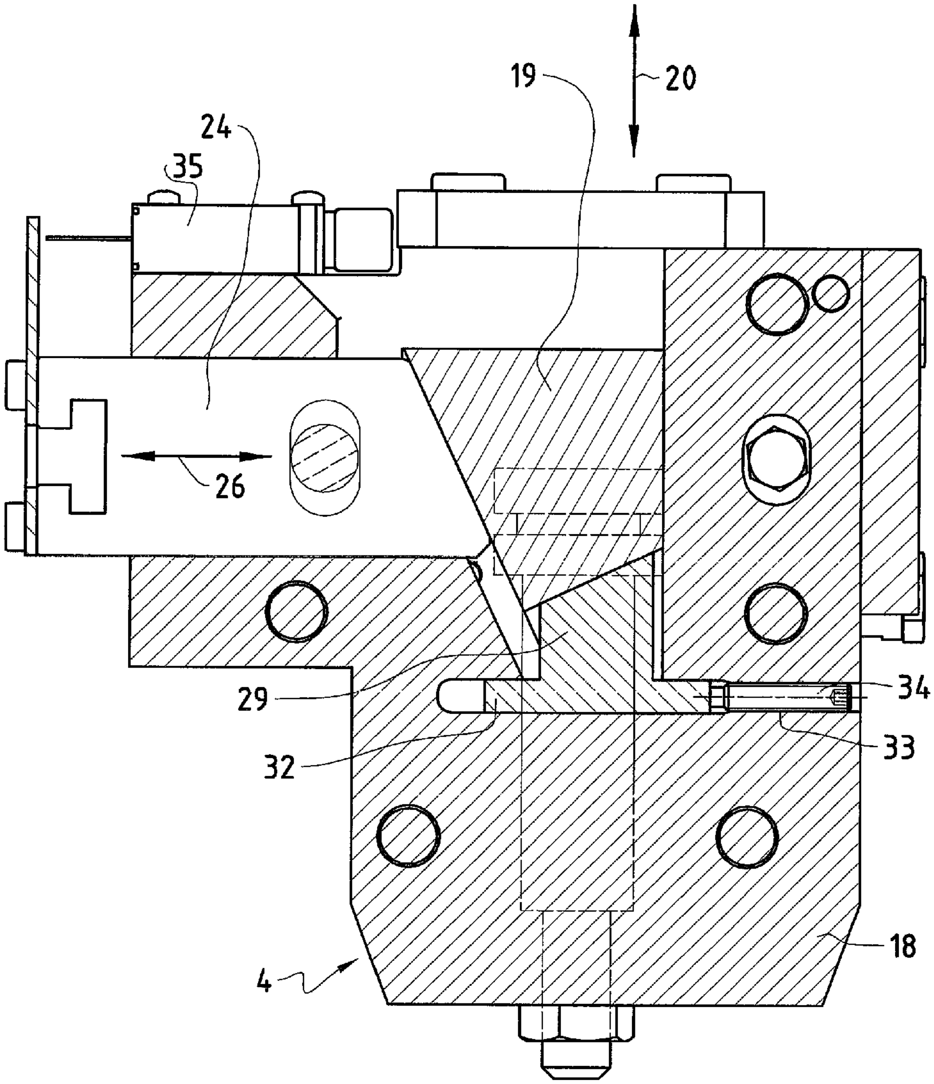
FIG. 5 shows a plan view of the cross pressing device according to FIG. 3, with some sectional views.

FIG. 5 shows the frame 18 of the cross pressing device 4, with the arrangement of the first wedge 19, the second wedge 24 and the third wedge 29. The third wedge 29 is equipped with a rib 32 which is held so as to be moveable in the frame 18 at right angles to the direction of motion of the first wedge 19, shown by the double arrow 20. In the frame 18 and in the cover plate 25 there is a hole 33 provided with a thread into which an adjustment screw 34 is screwed. Turning this adjustment screw 34 moves the wedge 29 at right angles to the direction of motion of the first wedge 19, whereby the lowermost position of the first wedge 19 in FIG. 5 can be fixed. This position also corresponds to the fully extended position of the second wedge 24 and thus of the cross pressing punch 5 (FIGS. 1 and 2). In this position the cross pressing punch is in the pressing position. This means the position of the cross pressing punch can be very accurately positioned in the pressing position by moving the third wedge 29. The position of the second wedge 24 and thus the cross pressing punch 5 is sensed in the known way by a measuring device 35 fastened on the frame 18 of the cross pressing device 4, the corresponding signal being transmitted to the machine control in the known way.

Figure 6:
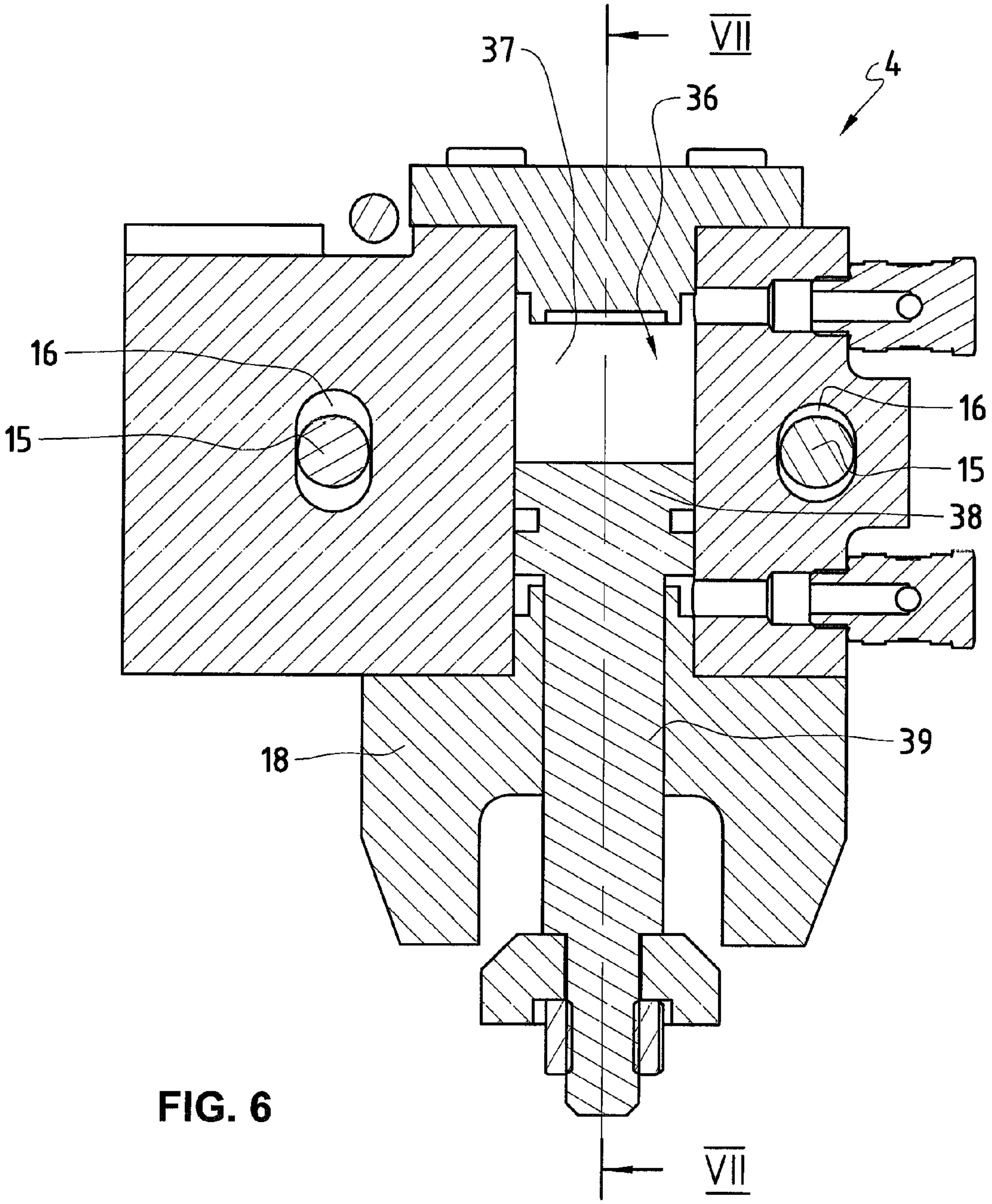
FIG. 6 shows a sectional view of the cross pressing device along line VI-VI according to FIG. 7.

FIG. 6 shows the drive unit 36 with which the first wedge 19, the second wedge 24 and hence the cross pressing punch 5 can be moved. This drive unit 36 comprises a hydraulic cylinder 37 arranged in the frame 18 of the cross pressing device 4, a piston 38 with a piston rod 39 fastened thereto being held in said hydraulic cylinder 37 so as to be moveable. This piston rod 39 is pushed backwards and forwards in the hydraulic cylinder 37 by means of suitable pressure being applied to the piston 38. FIG. 6 also shows the slit-shaped cut-outs 16 into which the clamping screws 15 are screwed to fasten the cross pressing device 4.

FIG. 7 again shows the drive unit 36, which is arranged in the frame 18 of the cross pressing device 14. A bracket 40 is fastened to the opposite end of the piston rod 39 to the piston 38, said bracket 40 being connected to the first wedge 19. The first wedge 19 can therefore be moved by moving the piston 38 in the hydraulic cylinder 37; the pressing position, as shown in FIG. 7 and in all previous Figures, incidentally, is determined by the third wedge 29.

Figure 7:
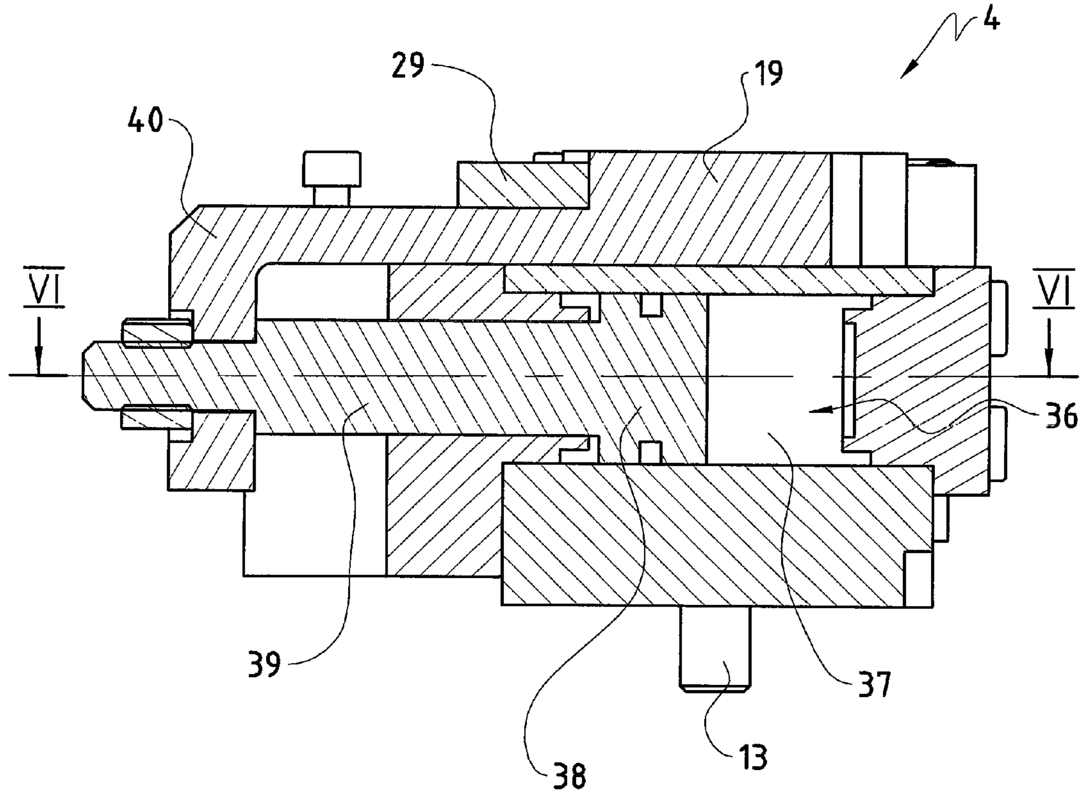
FIG. 7 shows a sectional view of the cross pressing device along line VII-VII according to FIG. 6.

Likewise visible in FIG. 7 is the bolt 13 whereby the cross pressing device 4 is positioned on plate 2 (FIGS. 1 and 2).

Figure 8:
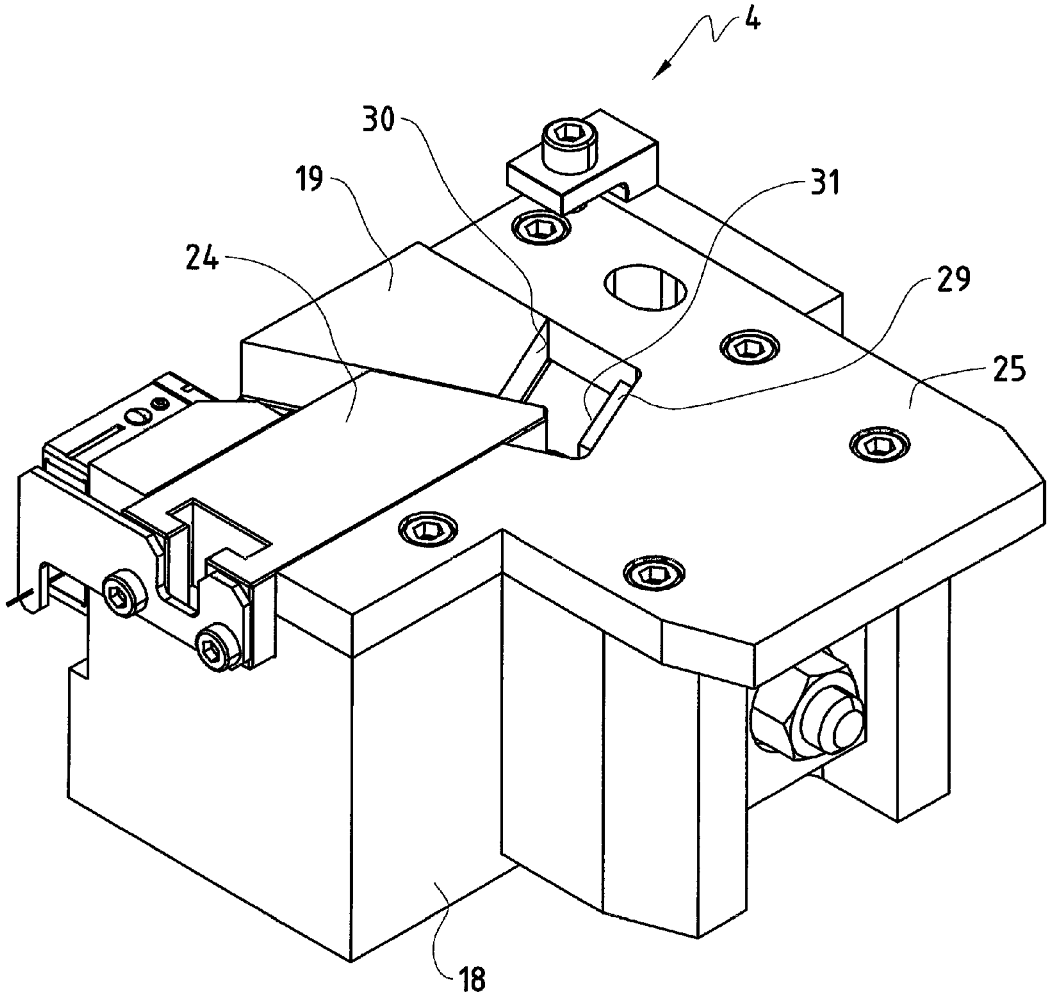
FIG. 8 shows a perspective view of the cross pressing device in the retracted position.

FIG. 8 shows the cross pressing device 4 according to FIG. 3, but where the second wedge 24 and hence the cross pressing punch (not shown) are in the retracted position. The first wedge 19 is thus also retracted, i.e. the additional wedge surface 30 of the first wedge 19 is a distance away from the wedge surface 31 of the third wedge 29.

Figure 9:
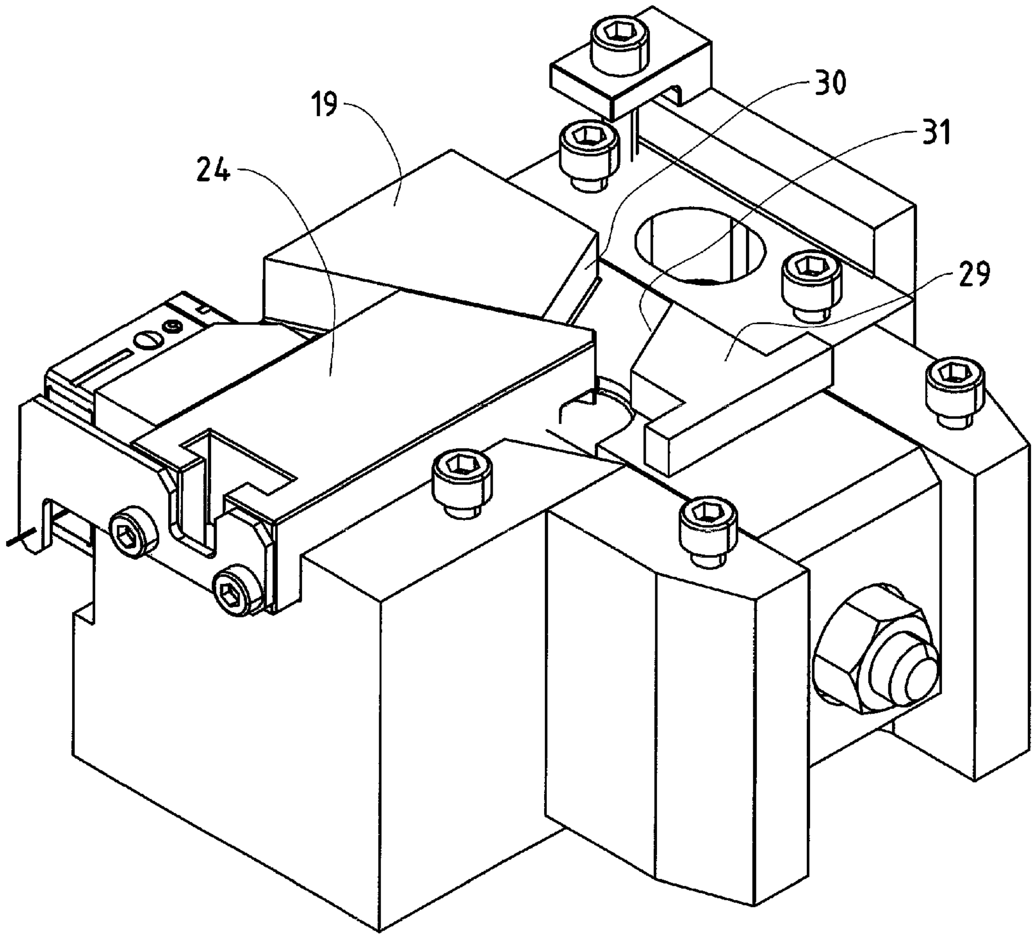
FIG. 9 shows a perspective view of the cross pressing device according to FIG. 8 with the cover plate removed.

FIG. 9 shows the cross pressing device 4 in the position shown in FIG. 8 although here the cover plate 25 has been omitted.

Figure 10:
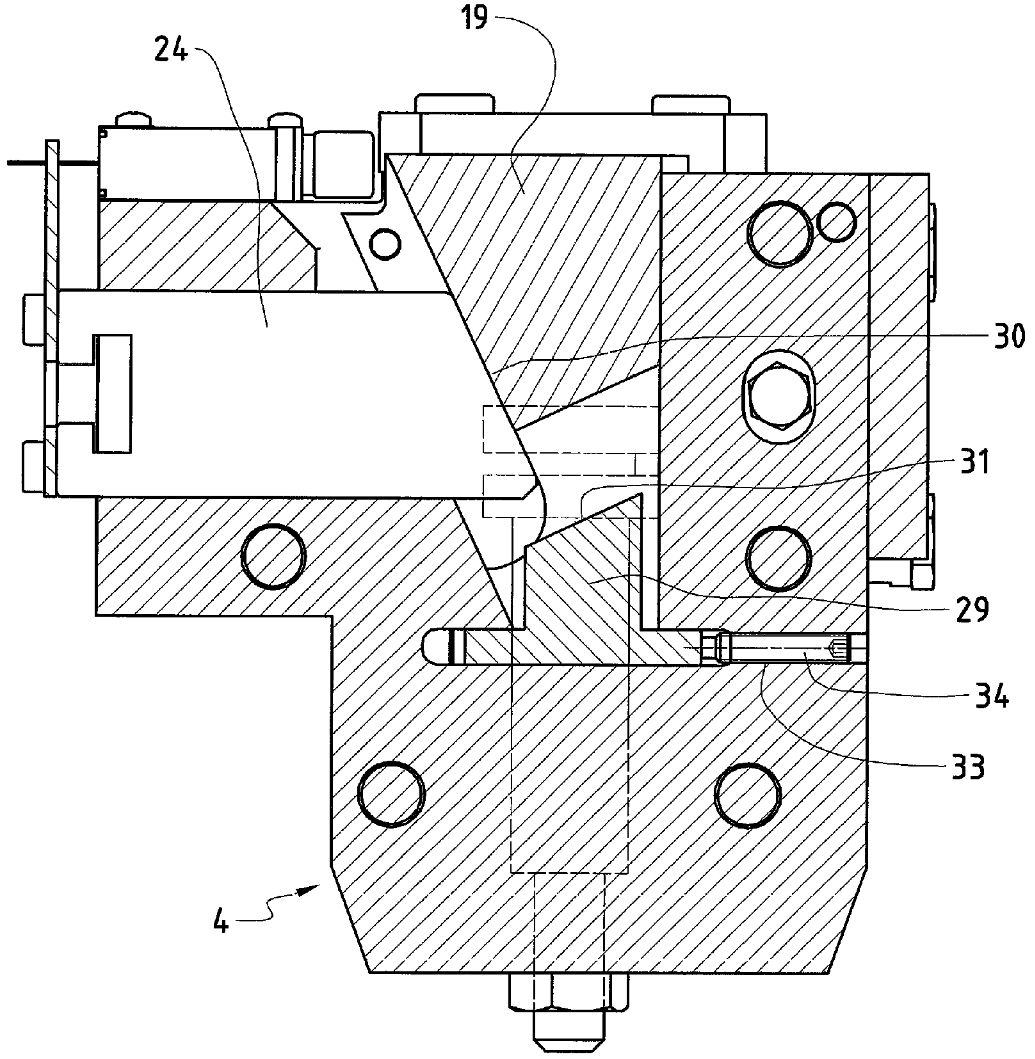
FIG. 10 shows a plan view of the cross pressing device according to FIG. 8, with some sectional views.

FIG. 10 shows the cross pressing device 4 in the corresponding position according to FIG. 8 and FIG. 9.

Figure 11:
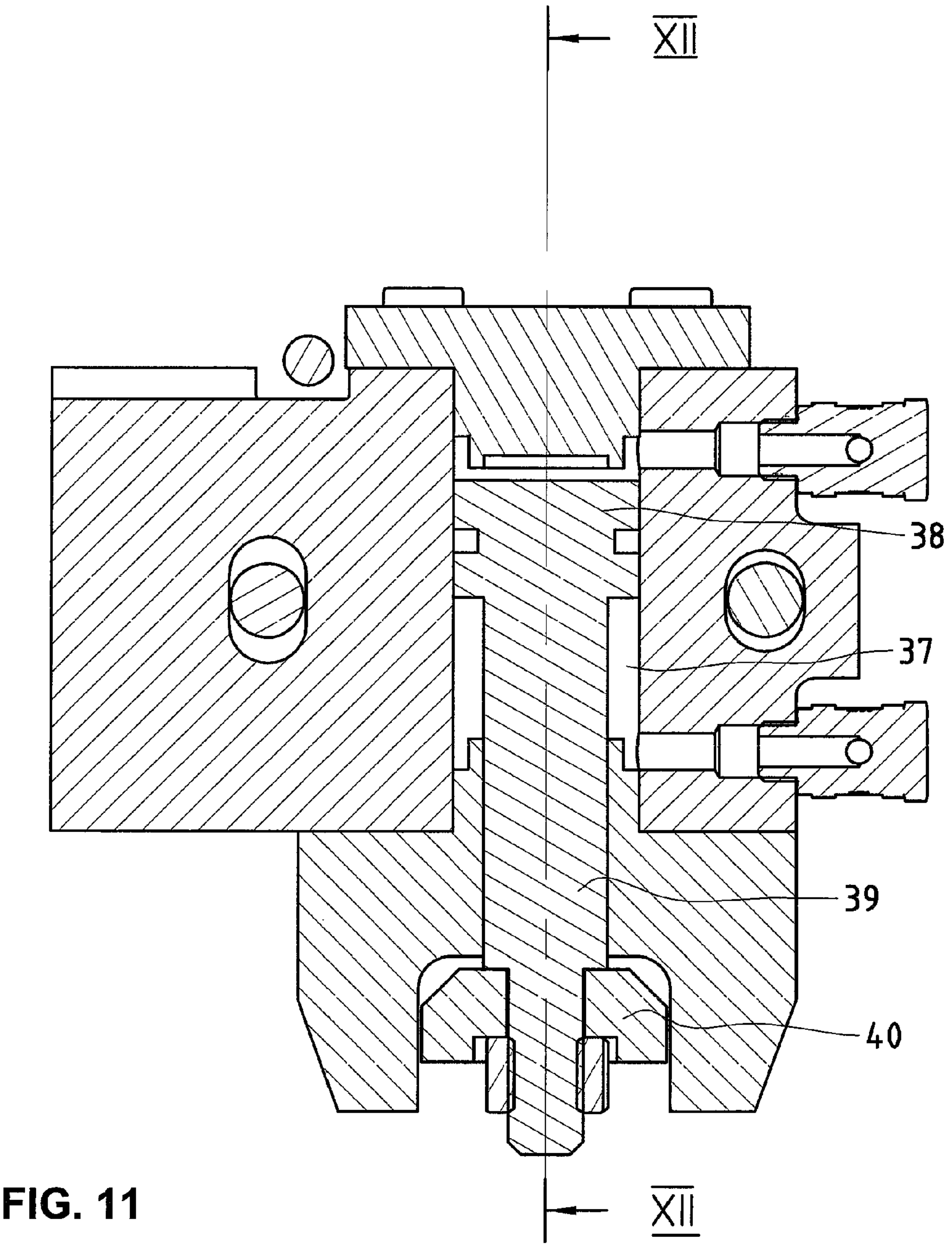
FIG. 11 shows a sectional view of the cross pressing device along line XI-XI according to FIG. 12.

The same position, in which the cross pressing punch is retracted, is shown in FIG. 11. The piston 38 is in the retracted position in the hydraulic cylinder 37. Correspondingly, the piston rod 39 and the bracket 40 fastened thereto are likewise in the retracted position.

Figure 12:
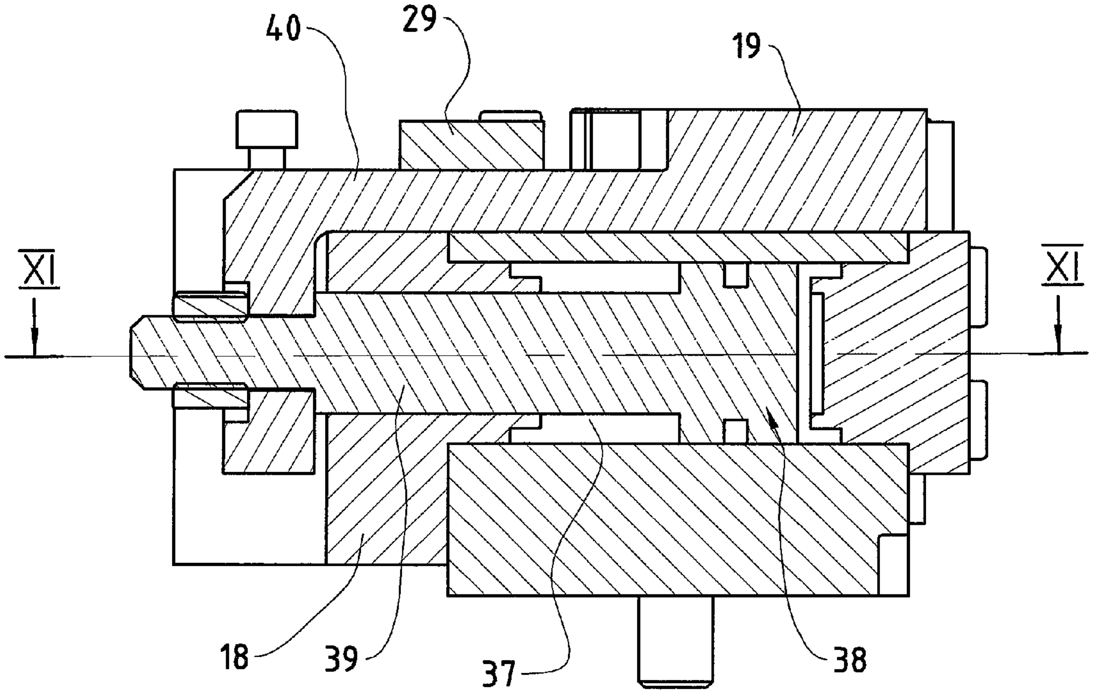
FIG. 12 shows a sectional view of the cross pressing device along line XII-XII according to FIG. 11.

The same representation as in FIG. 11 is likewise visible in FIG. 12, the piston 38 is in the retracted position.

In the representation according to FIG. 13 the first wedge 19 can be seen, which is equipped with a step 41, bolts 42 being arranged on said step 41. The second wedge 24, which is not shown in FIG. 13, is equipped with a cut-out corresponding to step 41, a groove is made into this cut-out into which the bolts 42 protrude. This arrangement couples the second wedge 24 to the first wedge 19; when the first wedge 19 is being retracted, and to retract the cross pressing punch out of the die, the second wedge 24 is likewise forcibly retracted via this connection.

As can be seen particularly well in FIG. 3, in which the pressing stamp is in the pressing position and must absorb the pressing forces acting on the front surface of the pressing punch during the process of pressing a compact, this absorbed pressing force is transferred in the axial direction to the second wedge 24, from whence this is transferred via the wedge surface of the second wedge 24 to the corresponding wedge surface 22 of the first wedge 19. The axial force component is transferred by the first wedge 19 onto the linear guide track 21 of the frame 18. The component created by the oblique position of the wedge surfaces 22 and 23, a component which acts in the direction of the double arrow 20, is relatively small due to the relatively small angle of inclination of these two wedge surfaces 22 and 23 and the friction thus caused, so that the residual force acting on the drive unit 36 is very small and can easily be taken over by the drive unit.

With this arrangement according to the invention it is possible to equip a powder press with several cross pressing devices, which can be positioned and fastened to the corresponding plate in a wide variety of ways and in different numbers. This allows a wide variety of compacts to be produced on this powder press, changeovers can easily be carried out in each case.

The invention claimed is:

1. Powder press for the production of a metal powder compact with an upper punch arrangement, a lower punch arrangement and a die arrangement which forms the mold cavity into which the metal powder can be filled; and then, to form the compact the upper punch arrangement and the lower punch arrangement can be pressed together in the pressing direction, controlled by a control unit; and the lower punch arrangement is equipped with a plate on which the die arrangement is fastened and to which plate cross pressing devices are fastened, each being equipped with a cross pressing punch which can be linearly driven by a drive unit and which can be pressed into and refracted out of the mold cavity in the cross pressing direction through an opening in the die which is essentially perpendicular to the pressing direction, wherein the drive unit of each cross pressing device comprises a linear drive unit with a fixed part fastened to the frame of the cross pressing device and a part which can be moved linearly relative to the fixed part, said linearly moveable part being connected to a first wedge whose wedge surface acts on the wedge surface of a second wedge which can essentially be moved perpendicularly to the first wedge in the direction of the cross pressing.

2. The powder press according to claim 1, wherein the first wedge and the second wedge can be moved along linear guide tracks fastened to the frame of the cross pressing device.

3. The powder press according to claim 1, wherein the pressing position of the cross pressing punch can be set by an adjustable end stop.

4. The powder press according to claim 3, wherein the end stop is formed by a third wedge which can be adjusted at right angles to the direction of the motion of the first wedge, this third wedge being guided in the frame and whose wedge surface interacts with a further wedge surface of the first wedge.

5. The powder press according to claim 1, wherein the position of the cross pressing punch in relation to the die arrangement can be determined by measuring device and transmitted to the control unit.

6. The powder press according to claim 1, wherein each cross pressing punch is held by a coupling device in the respective cross pressing device.

7. The powder press according to claim 1, wherein each cross pressing device is equipped with a protruding bolt and plate is equipped with several holes, said bolts protruding into one of the holes when the cross pressing device is placed onto plate and several cross pressing devices can be fastened on plate in different positions.

8. The powder press according to claim 7, wherein corresponding threaded holes are assigned to the holes in plate, clamping screws being able to be screwed into said threaded holes and being held in the frame of each cross pressing device in corresponding cut-outs.

9. The powder press according to claim 8, wherein the cut-outs have the form of a slit.

* * * * *

UNITED STATES PATENT AND TRADEMARK OFFICE

CERTIFICATE OF CORRECTION

PATENT NO. : 8,523,550 B2
APPLICATION NO. : 12/922871
DATED : September 3, 2013
INVENTOR(S) : Alex Wehrli, Daniel Meier and Beat Straub It is certified that error appears in the above-identified patent and that said Letters Patent is hereby corrected as shown below:

In the Claims

Claim 1, column 6, line 23, please change the word "refracted" to "retracted"

Signed and Sealed this
Nineteenth Day of November, 2013

Teresa Stanek Rea
*Deputy Director of the United States Patent and Trademark Office*

UNITED STATES PATENT AND TRADEMARK OFFICE

CERTIFICATE OF CORRECTION

PATENT NO. : 8,523,550 B2
APPLICATION NO. : 12/922871
DATED : September 3, 2013
INVENTOR(S) : Wehrli et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 400 days.

Signed and Sealed this
Fifteenth Day of September, 2015

Michelle K. Lee

Michelle K. Lee
*Director of the United States Patent and Trademark Office*